June 24, 1930.    G. H. BRUNOW    1,767,167
LIQUID LEVEL INDICATING DEVICE
Filed April 26, 1923
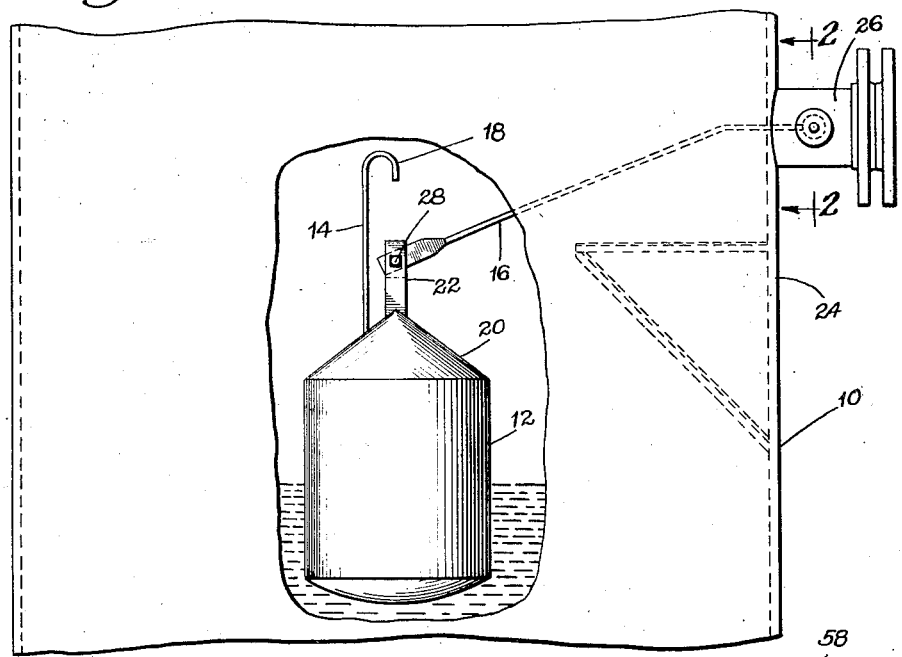
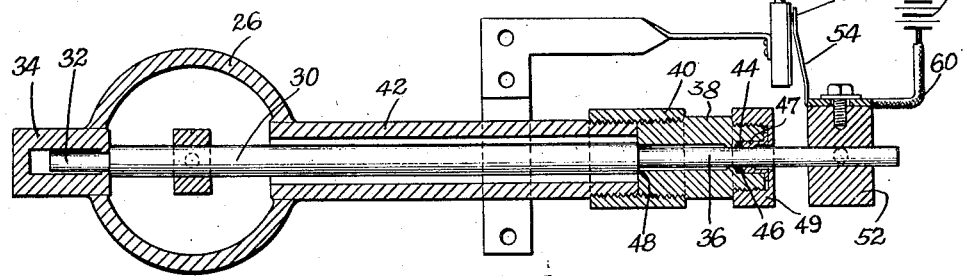
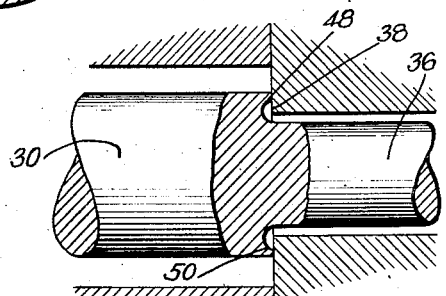
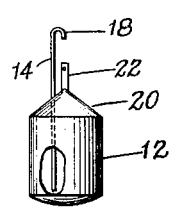
Inventor
Günther H. Brunow
By his Attorney Patented June 24, 1930

1,767,167

UNITED STATES PATENT OFFICE

GUINTHER H. BRUNOW, OF PORT ARTHUR, TEXAS, ASSIGNOR, BY MESNE ASSIGN-
MENTS, TO THE TEXAS COMPANY, OF NEW YORK, N. Y., A CORPORATION OF
DELAWARE

LIQUID-LEVEL-INDICATING DEVICE

Application filed April 26, 1923. Serial No. 634,916.

This invention relates to liquid level indicating devices employing hollow floats to indicate the fluctuations of the fluid level in containers and is especially adapted for use in connection with containers, such as oil stills, that are maintained and operated under pressure.

When hollow floats have been used in apparatus for the cracking of oil under heat and pressure, it has been necessary to use floats constructed of heavy material capable of withstanding the pressure to which they have been subjected. Such floats have not been found to be sufficiently sensitive to the fluctuations in the level of the oil within the still to be accurate and, furthermore, cumbersome counterweights have been required to offset the weight of the floats.

With these disadvantages in mind, one of the objects of the present invention is to provide a device of the general character mentioned, in which the float is constructed of light material which will render the float sensitive to the fluctuations of the oil level within the stills, and in order to relieve the float from crushing or collapsing under the pressure of the still, provision is made for equalizing the pressure within and without the float.

A further object of this invention is to provide a float adapted to be used in stills operated and maintained under heat and pressure, so constructed that the accumulation of carbon or coke on the roof of the float is minimized.

A still further object of this invention is to provide a float for use in stills of the character mentioned, having means for equalizing the pressure within and without the float, and at the same time to provide means for preventing the entrance of any liquid matter into the float.

Another object of this invention is to provide means outside the still for accurately indicating the changes in the liquid level within, while preventing any loss of pressure from the still at the point where the indicating mechanism extends through the wall of the still.

These and other objects of the invention will be readily understood from the following description of a preferred embodiment thereof illustrated in the accompanying drawings, in which Fig. 1 is a view in front elevation of a portion of a still, the wall being partially broken away to show the float therein.

Fig. 2 is a view, partially in section, taken on a line 2—2 of Fig. 1.

Fig. 3 is an enlarged view of a portion of the shaft showing the annular groove between the bearing member or bushing and the enlarged end of the shaft.

Fig. 4 is a view showing a modified form of float wherein the pressure equalizing tube extends some distance into the interior of the float.

Referring to the drawing, the apparatus shown comprises an oil still 10 adapted to be maintained under pressure; a hollow float 12 equipped with pressure equalizing means 14; a lever arm 16 pivotally connected to the float 12 and extending through the side wall of the still 10, and means operated in response to the movement of said lever for indicating the rise and fall of the float within the still.

The oil still 10 is of a well-known type employed in the cracking of oil by means of heat and pressure and, for the purpose of illustration is shown in Fig. 1, as containing a quantity of oil to be cracked. On the outside wall of the still 10, at a point intermediate its top and bottom, a hollow nipple 26 which communicates with the interior of the still is securely attached. This nipple is employed for supporting the mechanism which functions to transmit the movements of the float 12 to the indicating means outside the still.

The hollow float 12 is of light construction and is buoyed up by and partially immersed in the oil within the still 10. As the still is maintained under pressure a float of light construction would be likely to crush unless some method of equalizing the pressure within and without the float be employed, and this improved float is therefore provided with an aperture in its roof which accomplishes the desired result.

During the cracking process a considerable quantity of oil is violently agitated and splashed about in the still 10 and in order to prevent any of the splashed oil from entering the float 12 by way of the aperture in its roof, a small pipe 14 communicating with the interior of the float 12, and extending a considerable distance above its roof or top 20, is fitted into the aperture. To further insure that no oil can enter the float 12, the upper end of the pipe 14, just referred to, is preferably provided with an inverted U-bend 18.

Under certain working conditions it may develop that liquids, resulting from the condensation of gases or vapors, will collect in the bottom of the float 12. In such cases it is desirable to employ the modified form of float illustrated in Fig. 4, in which the pipe 14 extends downwardly so that it reaches approximately the bottom of the hollow chamber 12. The lower end of the pipe 14 may be formed with serrated edges (not illustrated) and the pipe may thus conveniently extend to the bottom of the float. Liquid collecting in the float is forced out when the contents of the still 10 are heated, the resultant pressure developed inside the float forcing the liquid out through the pipe 14.

During the cracking of oil by means of heat and pressure considerable carbon or coke may be produced, and if allowed to collect on the roof of the float, its weight seriously impairs the accuracy of the indicating device. In order to overcome this difficulty, the roof or top 20 is formed in the shape of a cone so that carbon and coke will have less tendency to adhere thereto. Thus a greater degree of accuracy in the working of the device is assured.

At the apex of the float roof 20 a bracket member 22 in the form of a yoke is mounted, and one end of the lever arm is pivotally connected between the fingers of the yoke. The opposite end of the lever arm 16 extends through the wall 24 of the still and terminates in a rotatable shaft 30 which has one end supported in a bearing member 34 which is welded into the hollow nipple 26 to which reference has already been made. The lever arm 16 is free to swing vertically as the float 12, to which it is attached, rises and falls within the still 10, and the pivotal connection 28 between the lever arm 16 and the bracket 22 is such that at no point in either its upward or downward course does the lever 16 come in contact with the bracket 22. Thus there is no danger of the float 12 being thrown out of alignment.

The opposite end 36 of shaft 30 is supported in a bearing member or bushing 38 which is secured by means of a pipe coupling 40 to one end of an elongated sleeve or pipe 42 the other end of which is welded into the nipple 26. The outer end of the bushing 38 is recessed to form a stuffing box 44 in which suitable packing 46, generally composed of copper and graphite, is employed. The packing 46 is maintained in position by a gland 47 and a cap 49 which is screwed onto the threaded outer end of the bushing 38. The vapor space in the elongated pipe or sleeve 42 prevents heat from the still from effecting the packing material 46. The outer end portion 36 of the shaft 30 is of reduced diameter, thus forming a shoulder 48 which is adapted to come in contact with the inner end of the bushing 38 as shown in Fig. 3. An annular groove 50, semi-circular in cross section, is formed in the annular face of the end of the enlarged portion of the shaft 30. The face of shoulder 48 is ground to insure a tight joint between the shoulder 48 and the end of the bearing member 38. In this manner provision is made for contraction and expansion, and the liability of the members sticking together is thus avoided.

Near the outer end of the shaft 30 a collar 52 is mounted and is keyed or otherwise rigidly secured to the shaft 30. The collar carries a contact arm 54 which is adapted to make electrical connection with a plurality of electrical contact members 56 arranged to operate a plurality of electric lamps 58 or the like. The collar 52 also carries a shaft or tubing to which a counterweight (not shown) may be secured.

In operation the hollow float 12 rises and falls with the changes of the liquid level within the still 10. The lever arm 16 which is pivotally connected to the float 12 is thus either raised or lowered and this vertical motion is transmitted to the rotatable shaft 30 to which the lever arm 16 is rigidly connected. The rotating movement of the shaft 30 is likewise transmitted to the contact arm 54 which is brought into engagement with the electrical contact members 56. By means of an electrical circuit comprising cables 60, batteries 62 and the lamps 58, the different lamps 58 are lighted, and by means of these lamps the operator in charge can instantly and accurately determine the level of the fluid within the still 10.

While the foregoing description applies particularly to oil stills maintained under pressure, it will readily be seen that the device can be used in connection with any liquid container with equal success.

For illustrative purposes the construction and operation of the present invention have been set forth in more or less detail, but it will be understood that the invention is not so restricted and it is therefore desired that only such limitations shall be imposed as are indicated in the appended claims.

Having thus described a preferred em- bodiment of the invention, that which is claimed as new is:—

What I claim is:

1. The combination with a still for oil maintained under heat and pressure, of a liquid level indicating device comprising, a vertically movable float disposed within the still, a chambered member secured to the outer wall of the still and in open communication with the interior thereof, a rotatable shaft supported at one end within the chambered member and having its other end extending through the opposite wall thereof, a lever arm pivotally connected at one end to the float and rigidly secured at the opposite end to the rotatable shaft, a sleeve member secured to and connecting with the interior of the chambered member for enclosing the extended end of the shaft and providing an elongated vapor space, a bearing near the outer extremity of the sleeve member for supporting one end of the shaft, packing means disposed in the outer end of the sleeve member and cooperating with the shaft for preventing the loss of pressure from the still, means for indicating the movement of the float within the still, and means responsive to the movement of the shaft for controlling the indicating means.

2. The combination with a still maintained under heat and pressure, of a liquid level indicating device, comprising a chambered member disposed on the outside of the still and in open communication with the interior thereof, a tubular member connected to the chambered member and in open communication therewith, a bearing member having a longitudinal bore of smaller diameter than that of the tubular member secured to one end of and coaxial with said tubular member, a shaft adapted to rotate in said tubular member and formed with one end of reduced diameter and said portion of reduced diameter being supported in the bearing member, packing means disposed around the shaft in the bearing member, a lever arm connected to the shaft within the chambered member, a float within the still connected with the lever arm and adapted to rotate the shaft, means outside the still for indicating the rise and fall of liquid in the still, and means responsive to the movement of the shaft for controlling the indicating means.

3. A liquid level indicating device for a still comprising, a chambered member disposed on the outside of the still near its top and in open communication with the interior thereof, a horizontally disposed tubular member connected to the chambered member and in communication therewith, a shaft adapted to rotate within the tubular member, packing means disposed around the shaft near the outer end of the tubular member, indicator controlling means secured to the shaft outwardly of the packing means, a float within the still, means for operatively connecting the float with the shaft for imparting a rotative movement to the shaft in accordance with the rise or fall of the float, and means responsive to said indicator controlling means for indicating the rise and fall of liquid in the still.

4. A liquid level indicating device for a still, comprising a chambered member disposed on the outside of the still and in open communication with the interior thereof, a horizontally disposed tubular member connected to the chambered member, a bearing member having a longitudinal bore of smaller diameter than that of the tubular member secured to one end of and co-axial with the tubular member, a shaft having one end of reduced diameter adapted to rotate in the tubular member with the portion of reduced diameter supported in the bearing member, packing means disposed around the shaft in the bearing member, indicator controlling means on the shaft outwardly of the bearing member, a float within the still operatively connected with the shaft and adapted to rotate the shaft to operate the indicator controlling means, and an indicator responsive to said controlling means for indicating the rise and fall of liquid in the still.

5. The combination with a still maintained under heat and pressure, of a chambered member disposed on the outside of the still and in open communication with the interior thereof, an elongated tubular member connected to the chambered member, a bearing member having a longitudinal bore of smaller diameter than that of the tubular member secured to the end of and co-axial with the tubular member, a shaft adapted to rotate in the tubular member and having one end of reduced diameter extending through the bearing member, the enlarged end of the shaft contacting with the inner end of the bearing member and forming a partial seal between the tubular member and the bearing member, a float within the still, a lever arm connecting the float with the shaft, means for indicating the rise and fall of the float within the still, and means responsive to the rotation of the shaft for controlling the indicating means.

6. The combination with a still maintained under heat and pressure, of a chambered member disposed on the outside of the still and in open communication with the interior thereof, an elongated tubular member connected to the chambered member, a bearing member having a longitudinal bore of smaller diameter than that of the tubular member secured to the end of the tubular member, a shaft adapted to rotate in the tubular member and having one end thereof of reduced diameter extending through the bearing member, one end of the large section of the shaft having an annular groove disposed therein and the raised portion of the end forming a seal with one end of the bearing member, a float within the still, a lever arm connecting the float with the shaft, means for indicating the movement of the float within the still, and means operating in response to the movement of the shaft for controlling the indicating means.

In witness whereof I have hereunto set my hand and seal this 16th day of April, 1923.

G. H. BRUNOW.